June 16, 1953    J. OREL    2,641,966
FOUR-MEMBER PHOTOGRAPHIC OBJECTIVE
Filed Jan. 20, 1951    2 Sheets-Sheet 1
FIG. 1
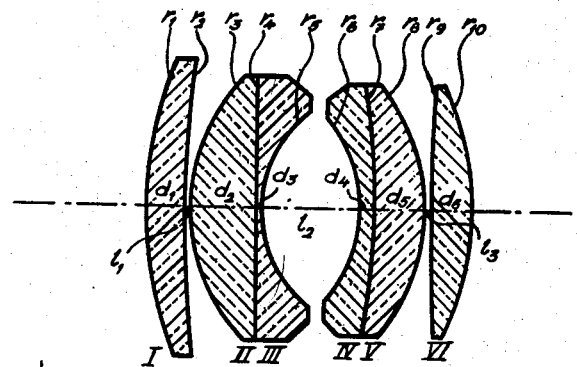
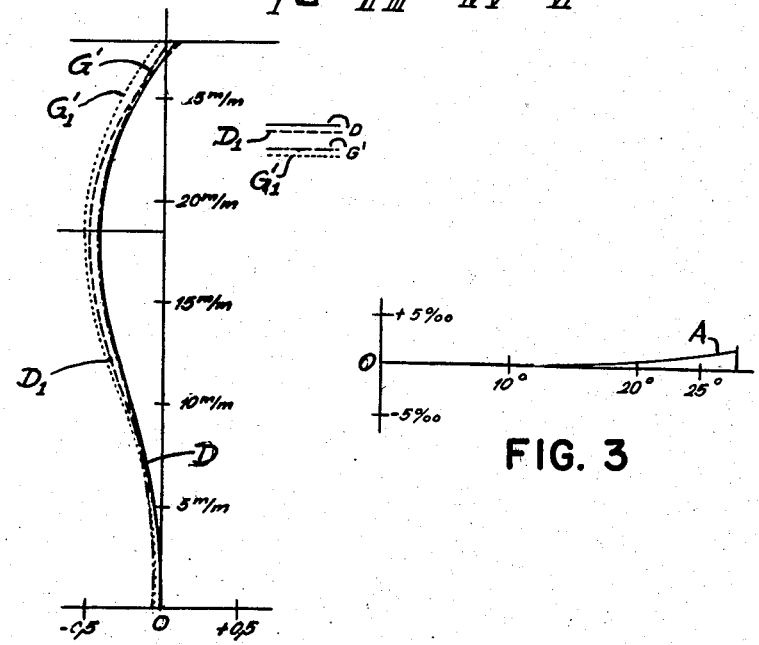
FIG. 2
FIG. 3
INVENTOR.
Jaroslav Orel
BY Richard *[signature]*
AGENT June 16, 1953  J. OREL  2,641,966
FOUR-MEMBER PHOTOGRAPHIC OBJECTIVE
Filed Jan. 20, 1951  2 Sheets-Sheet 2
FIG. 4
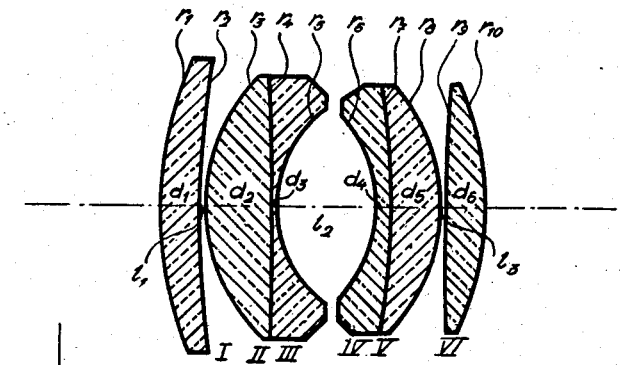
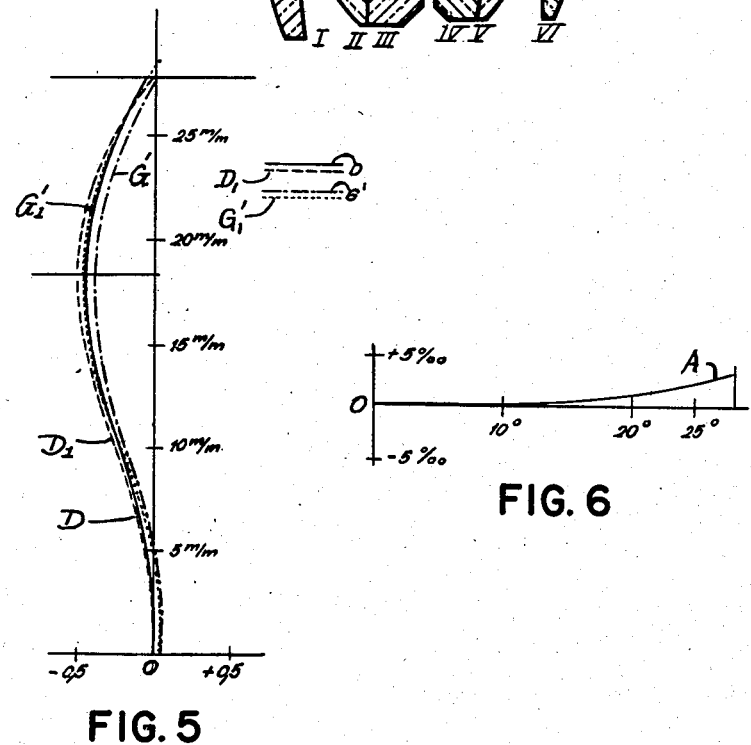
FIG. 5
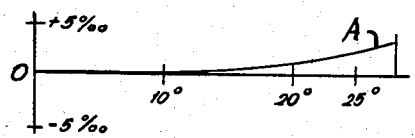
FIG. 6
INVENTOR.
Jarolav Orel
BY
AGENT Patented June 16, 1953

2,641,966

UNITED STATES PATENT OFFICE 2,641,966

FOUR-MEMBER PHOTOGRAPHIC OBJECTIVE

Jaroslav Orel, Prerov, Czechoslovakia, assignor to Meopta, národní podnik, Prerov, Czechoslovakia, a corporation of Czechoslovakia Application January 20, 1951, Serial No. 206,961
In Czechoslovakia February 1, 1950

5 Claims. (Cl. 88—57)

The object of the invention relates to a photographic objective in which spherical and chromatic aberrations, astigmatism, coma and distortion are corrected. It consists of four members separated by air gaps. The outer members are simple convergent lenses enclosing two divergent menisci whose concave surfaces face the diaphragm and which consist of two lenses, the lens in the vicinity of the diaphragm being a divergent one.

In comparison with known objectives of similar construction, the objective in accordance with the invention yields an advantage residing in the fact that with a flat field of vision and a high speed of lens the distortion is better corrected and the chromatic aberration of position and magnification is smaller, the spherical-chromatical aberration being corrected for two colours at the same time.

The invention is characterized by the fact that the radius of the cemented surface of the meniscus on the side of the object is larger than five times the equivalent focal length of the objective, the radius of the cemented surface of the meniscus on the side of the image being concave against the direction of the advancing light and larger than the equivalent focal length. In addition to this, the radius of the outer convergent lens on the side of the object facing the object is at least ten times larger than the radius facing the image.

The object of the invention is further characterized by the fact that the refractive index of the divergent lens of the meniscus on the side of the object is larger by at least 0.06 than the refractive index of the divergent lens on the side of the image, Abbé numbers being greater than 31. The refractive indices of the convergent lenses on the side of the object are smaller than 1.63 and Abbé numbers are greater than 50. The refractive indices on the side of the image are larger than 1.61 and Abbé numbers are smaller than 60.

The outer convergent lens on the side of the object has a focal length which is at least 1.5 times larger than the equivalent focal length of the objective. The outer convergent lens on the side of the image has a focal length which is smaller than the equivalent focal length of the objective, and the focal lengths of the compound divergent menisci differ absolutely by 10% at the utmost.

The constructional length of the objective according to the invention is smaller than 0.7 times the equivalent focal length of the objective, and the air gap between the divergent menisci lies within limits of 0.16 to 0.22 times the equivalent focal length of the objective.

The object of the invention is schematically illustrated in the accompanying drawings by two embodiments.

In the drawings:

Figs. 1 and 4 are cross sections of the objective;

Figs. 2 and 5 show the correction curves of the spherical aberrations of lines D, $D_1$, $G'$, $G_1'$ at a focal length f=100 mm.;

Figs. 3 and 6 show the correction curves of distortion.

The notations in the drawings and in the tables shown below are:

$r$=radius of curvature
$d$=thickness of length
$l$=lens distance
$L$=constructional length of objective
$D$=spherical aberration for the yellow
$D_1$=sine condition for the yellow
$G'$=spherical aberration for the violet
$G_1'$=sine condition for the violet
$A$=distortion for the drawing scale
$N=\infty$, that is, for the "infinitely remote object"

The types of glass employed are indicated by the refractive indices $nD$ for the sodium line D and by the value $\nu$. The individual lenses are marked I, II, III, IV, V, VI. The dimensions are given in mm. The focal length of the objective is f and the focal lengths of the individual members are $f_1$, $f_2$, $f_3$, $f_4$.

The objectives according to the invention are shown below.

Example I (Figs. 1, 2, 3)

[Focal length 100 mm; relative aperture 1 : 1.8; Field of vision 55°.]

| Radius | Lens thickness and distance | lens | Type of glass | |
|---|---|---|---|---|
| | | | $n_D$ | $\nu$ |
| $r_1 = +72.98$ | | | | |
| | $d_1 = 8.95$ | I | 1.622 | 53.1 |
| $r_2 = +316.79$ | | | | |
| | $l_1 = 0.20$ | | | |
| $r_3 = +35.88$ | | | | |
| | $d_2 = 12.75$ | II | 1.622 | 53.1 |
| $r_4 = \infty$ | | | | |
| | $d_3 = 2.0$ | III | 1.596 | 32.9 |
| $r_5 = +23.91$ | | | | |
| | $l_2 = 20.0$ | | | |
| $r_6 = -26.92$ | | | | |
| | $d_4 = 2.0$ | IV | 1.667 | 33.1 |
| $r_7 = -140.26$ | | | | |
| | $d_5 = 12.15$ | V | 1.617 | 54.0 |
| $r_8 = -35.88$ | | | | |
| | $l_3 = 0.20$ | | | |
| $r_9 = +1040.58$ | | | | |
| | $d_6 = 7.55$ | VI | 1.613 | 58.6 |
| $r_{10} = -57.43$ | | | | |
| | $L = 65.80$ | | | |

Focal length of members:

$$f_1 = 150.3 \text{ mm.}$$
$$f_2 = 275.8 \text{ mm.}$$
$$f_3 = 286.4 \text{ mm.}$$
$$f_4 = 89.1 \text{ mm.}$$

*Example II (Figs. 4, 5, 6)*

[Focal length 100 mm.; relative aperture 1 : 1.8; field of vision 55°.]

| Radius | Lens thickness and distance | lens | Type of glass | |
|---|---|---|---|---|
| | | | $n_D$ | $\nu$ |
| $r_1 = +72.98$ | | | | |
| | $d_1 = 8.95$ | I | 1.622 | 53.1 |
| $r_2 = +316.79$ | | | | |
| | $l_1 = 0.20$ | | | |
| $r_3 = +35.88$ | | | | |
| | $d_2 = 12.75$ | II | 1.622 | 53.1 |
| $r_4 = -500.10$ | | | | |
| | $d_3 = 2.0$ | III | 1.595 | 32.9 |
| $r_5 = +23.90$ | | | | |
| | $l_2 = 20.0$ | | | |
| $r_6 = -26.97$ | | | | |
| | $d_4 = 2.0$ | IV | 1.667 | 33.1 |
| $r_7 = -143.89$ | | | | |
| | $d_5 = 12.15$ | V | 1.617 | 54.0 |
| $r_8 = -35.88$ | | | | |
| | $l_3 = 0.20$ | | | |
| $r_9 = +1056.6$ | | | | |
| | $d_6 = 7.55$ | VI | 1.613 | 58.6 |
| $r_{10} = -57.48$ | | | | |
| | L = 65.80 | | | |

Focal length of members:

$$f_1 = 150.3 \text{ mm.}$$
$$f_2 = 271.6 \text{ mm.}$$
$$f_3 = 285.1 \text{ mm.}$$
$$f_4 = 89.2 \text{ mm.}$$

In photographic objectives having a high speed of lens and a large field of vision it is required that the sum of the Petzval curvatures ($\Sigma P$) should be small and that, at the same time, the distortion should be small and the spherical-chromatical aberration should be corrected.

Known objectives of the type described possess, at a high speed of lens, a Petzval sum which lies within limits of $+0.167$ to $+0.287$, but they are intended for a smaller field of vision or are attended with a greater distortion than the objective according to the invention.

In both mentioned examples of this invention the sum of the Petzval curvatures is approximately $\Sigma P = +0.204$, the distortion being $+2.5\%$ so that these objectives can be used with advantage in cinematographic cameras.

I claim:

1. A photographic objective in which the spherical and chromatic aberrations, astigmatism, coma and distortion are corrected, consisting of four members axially spaced and separated by air gaps, of which the two outer members are simple convergent lenses and the two inner members are divergent menisci whose concave surfaces face the diaphragm therebetween, each of said inner members consisting of two lenses united by cement, of which the lens in the vicinity of the diaphragm is a divergent one, the radius of the cemented surface of the meniscus component on the object side being 5 f to 500 f, whereby f is the focal length of the objective, the radius of the cemented surface of the meniscus component on the image side being concave against the direction of the advancing light and being f to 2 f, and of the two radii of the outer converging lens on the image side, the radius facing the object being between ten times the radius, that faces the image, and ∞.

2. The photographic objective according to claim 1, the outer converging lens on the object side having a focal length at least 1.5 times larger than the equivalent focal length of the objective, the outer converging lens on the image side having a focal length which is smaller than the equivalent focal length of the objective, and the focal lengths of the compound divergent menisci differing absolutely by 10% at the most from each other.

3. The photographic objective according to claim 1, its constructional length being smaller than 0.7 times the equivalent focal length of the objective, and the air gap between the divergent menisci lying within limits of 0.16 to 0.22 times the equivalent focal length of the objective.

4. Photographic objective having numerical data substantially as set forth in the following table:

| Radius | Lens thickness and distance | Refractive index $n_D$ | $\nu$ |
|---|---|---|---|
| $r_1 = +\ 72.98$ | | | |
| | $d_1 = 8.95$ | 1.622 | 53.1 |
| $r_2 = +\ 316.79$ | | | |
| | $l_1 = 0.20$ | | |
| $r_3 = +\ 35.88$ | | | |
| | $d_2 = 12.75$ | 1.622 | 53.1 |
| $r_4 = \infty$ | | | |
| | $d_3 = 2.0$ | 1.596 | 32.9 |
| $r_5 = +\ 23.91$ | | | |
| | $l_2 = 20.0$ | | |
| $r_6 = -\ 26.92$ | | | |
| | $d_4 = 2.0$ | 1.667 | 33.1 |
| $r_7 = -\ 140.26$ | | | |
| | $d_5 = 12.15$ | 1.617 | 54.0 |
| $r_8 = -\ 35.88$ | | | |
| | $l_3 = 0.20$ | | |
| $r_9 = +1,040.58$ | | | |
| | $d_6 = 7.55$ | 1.613 | 58.6 |
| $r_{10} = -\ 57.43$ | | | |
| | L = 65.80 | | | wherein the focal lengths of the numbers are:

$$f_1 = 150.3 \text{ mm.}$$
$$f_2 = 275.8 \text{ mm.}$$
$$f_3 = 286.4 \text{ mm.}$$
$$f_4 = 89.1 \text{ mm.}$$

and wherein $r_1, r_2 \ldots$ indicate the radii of the individual surfaces counting from the front, $d_1, d_2 \ldots$ indicate the axial thickness of the individual six elements, $l_1, l_2$ and $l_3$ indicate the lens distances, and L indicates the constructional length of the objective.

5. Photographic objective having numerical data substantially as set forth in the following table:

| Radius | Lens thickness and distance | Refractive index $n_D$ | $\nu$ |
|---|---|---|---|
| $r_1 = +\ 72.98$ | | | |
| | $d_1 = 8.95$ | 1.622 | 53.1 |
| $r_2 = +\ 316.79$ | | | |
| | $l_1 = 0.20$ | | |
| $r_3 = +\ 35.88$ | | | |
| | $d_2 = 12.75$ | 1.622 | 53.1 |
| $r_4 = -\ 500.10$ | | | |
| | $d_3 = 2.0$ | 1.595 | 32.9 |
| $r_5 = +\ 23.99$ | | | |
| | $l_2 = 20.0$ | | |
| $r_6 = -\ 26.97$ | | | |
| | $d_4 = 2.0$ | 1.667 | 33.1 |
| $r_7 = -\ 143.89$ | | | |
| | $d_5 = 12.15$ | 1.617 | 54.0 |
| $r_8 = -\ 35.88$ | | | |
| | $l_3 = 0.20$ | | |
| $r_9 = +1,056.6$ | | | |
| | $d_6 = 7.55$ | 1.613 | 58.6 |
| $r_{10} = -\ 57.48$ | | | |
| | L = 65.80 | | | wherein the focal lengths of the members are:

$f_1 = 150.3$ mm.
$f_2 = 271.6$ mm.
$f_3 = 285.1$ mm.
$f_4 = 89.2$ mm.

and wherein $r_1, r_2 \ldots$ indicate the radii of the individual surfaces counting from the front, $d_1, d_2 \ldots$ indicate the axial thicknesses of the individual six elements, $l_1, l_2$ and $l_3$ indicate the lens distances, and L indicates the constructional length of the objective.

JAROSLAV OREL.

References Cited in the file of this patent

UNITED STATES PATENTS

| Number | Name | Date |
|---|---|---|
| 583,336 | Rudolph | May 25, 1897 |
| 1,955,591 | Lee | Apr. 17, 1934 |
| 2,252,681 | Aklin | Aug. 19, 1941 |
| 2,319,171 | Warmisham et al. | May 11, 1943 |
| 2,532,751 | Baker | Dec. 5, 1950 |

FOREIGN PATENTS

| Number | Country | Date |
|---|---|---|
| 560,610 | Great Britain | Apr. 12, 1944 |